US007953674B2

(12) United States Patent
Wu et al.

(10) Patent No.: US 7,953,674 B2
(45) Date of Patent: May 31, 2011

(54) FUZZING SYSTEM AND METHOD FOR EXHAUSTIVE SECURITY FUZZING WITHIN AN SQL SERVER

(75) Inventors: Jiazhen Wu, Sammamish, WA (US); Raul Garcia, Kirkland, WA (US); Craig Alan Gick, Woodinville, WA (US); Erik Ismert, Shoreline, WA (US); Adrian Sorin Baras, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 889 days.

(21) Appl. No.: 11/750,132

(22) Filed: May 17, 2007

(65) Prior Publication Data
US 2008/0288822 A1 Nov. 20, 2008

(51) Int. Cl.
*G06F 15/18* (2006.01)
(52) U.S. Cl. .......................................................... 706/1
(58) Field of Classification Search ............... 706/45, 706/52, 1; 714/100, 26, 38, 32, 28; 726/22–25
See application file for complete search history.

(56) References Cited

U.S. PATENT DOCUMENTS

| | | | |
|---|---|---|---|
| 5,652,835 A | 7/1997 | Miller | |
| 6,148,427 A | 11/2000 | Sherwood et al. | |
| 6,378,088 B1 | 4/2002 | Mongan | |
| 6,378,126 B2* | 4/2002 | Tang | 717/143 |
| 6,408,403 B1 | 6/2002 | Rodrigues et al. | |
| 6,581,052 B1 | 6/2003 | Slutz | |
| 6,625,764 B1 | 9/2003 | Dawson | |
| 6,775,824 B1 | 8/2004 | Osborne, II et al. | |
| 6,859,922 B1 | 2/2005 | Baker et al. | |
| 2003/0061207 A1* | 3/2003 | Spektor | 707/3 |
| 2004/0254919 A1* | 12/2004 | Giuseppini | 707/3 |
| 2006/0031718 A1 | 2/2006 | Thornhill et al. | |
| 2006/0053164 A1* | 3/2006 | Ewing et al. | 707/104.1 |
| 2007/0038898 A1 | 2/2007 | Clee et al. | |
| 2008/0256340 A1* | 10/2008 | Conger et al. | 712/217 |

OTHER PUBLICATIONS

DeMott, The Evolving Art of Fuzzing, 2006, pp. 1-25.*
Bach et al., Good and Practical Ideas for Testers, Sep. 2006, Quality Software and Testing, vol. 4, issue 2, pp. 1-35.*
Allen et al., A Model-based Approach to the Security Testing of Network Protocol Implementations, 2006, IEEE, pp. 1008-1015.*
Lipner, The Trustworthy Computing Security Development Lifecycle, Dec. 2004, Proceedings of the 20th Annual Computer Security Applications Conferences, pp. 1-12.*
Ilja Van Sprundel. Fuzzing: Breaking software in an automated fashion. Dec. 8, 2005. http://events.ccc.de/congress/2005/fahrplan/attachments/582-paper_fuzzing.pdf.
Anup K. Ghosh, et al. Testing the Robustness of Windows NT Software. http://www.cigital.com/papers/download/issre98_CR.ps. Last accessed Mar. 19, 2007.
Christoph Csallner, et al. JCrasher: an automatic robustness tester for Java. Sep. 23, 2002. pp. 1025-1051. http://www.cc.gatech.edu/people/home/csallnch/papers/csallner04jcrasher.pdf.

* cited by examiner

*Primary Examiner* — David R Vincent
(74) *Attorney, Agent, or Firm* — Turocy & Watson, LLP

(57) ABSTRACT

Systems and methods that incorporate fuzzing capabilities within an SQL server to facilitate penetration testing. A fuzzing component associated with the SQL server provides an entry point for accessing the fuzzing system to update explicit user specified parameters associated with SQL, wherein the server's in depth knowledge regarding semantics of the language code (e.g., manner of parsing) can be employed to determine vulnerabilities thereof.

19 Claims, 10 Drawing Sheets

FUZZING SYSTEM AND METHOD FOR EXHAUSTIVE SECURITY FUZZING WITHIN AN SQL SERVER

BACKGROUND

Advent of a global communications network such as the Internet has facilitated exchange of enormous amounts of information. Additionally, costs associated with storage and maintenance of such information has declined, resulting in massive data storage structures. Hence, substantial amounts of data can be stored as a data warehouse, which is a database that typically represents business history of an organization. For example, such stored data is employed for analysis in support of business decisions at many levels, from strategic planning to performance evaluation of a discrete organizational unit. Such can further involve taking the data stored in a relational database and processing the data to make it a more effective tool for query and analysis.

Accordingly, it is important to store such data in a manageable manner that facilitates user friendly and quick data searches and retrieval. In general, a common approach is to store electronic data in a database. A database functions as an organized collection of information, wherein data is structured such that a computer program can quickly search and select desired pieces of data, for example. Commonly, data within a database is organized via one or more tables, and the tables are arranged as an array of rows and columns.

Moreover, such tables can comprise a set of records, wherein a record includes a set of fields. Records are commonly indexed as rows within a table and the record fields are typically indexed as columns, such that a row/column pair of indices can reference particular datum within a table. For example, a row can store a complete data record relating to a sales transaction, a person, or a project. Likewise, columns of the table can define discrete portions of the rows that have the same general data format, wherein the columns can define fields of the records.

In general, each individual piece of data, standing alone, is not very informative. Database applications allow the user to compare, sort, order, merge, separate and interconnect the data, so that useful information can be generated from the data. Moreover, capacity and versatility of databases have grown incredibly to allow virtually endless storage capacity utilizing databases.

In such databases, it is often required to perform penetration testing for related software products. Such testing can evaluate the security of software application and computer systems by simulating attacks by hackers. Fuzz testing or fuzzing has typically been widely employed as an effective way for penetration testing, wherein random data is fed into the input of software, and potential crash scenarios evaluated.

In the case of Structured Query Language (SQL) servers, fuzz testing has been focused on feeding random data and changing parameters to Transact SQL (T-SQL) statement. In order to get fuzzed input into the program, such can also require valid, syntax correct SQL statements, so that tests are not rejected upfront by language parsing and syntax checking. Moreover, creating valid T-SQL statements that are supported can be a difficult and time-consuming task, (e.g., possible existence of a myriad of valid individual T-SQL statements, each of which can be employed in different ways, with many different options and parameters.) Such difficulties can significantly limit fuzz testing capabilities.

SUMMARY

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

The subject innovation providers for systems and methods that incorporate fuzz testing (fuzzing) capabilities within an SQL server (e.g., within a parser or lexical analyzer thereof), via employing a fuzzing component that facilitates penetration testing. The fuzzing component provides an entry point for accessing the fuzzing system to update explicit user specified parameters, which are associated with SQL statements (e.g., constant values, table names and the like). Accordingly, from a parser's point of view, an output thereof includes fuzz values that are potentially generated inside the SQL server (e.g., risky constructs, random values, and the like), and which replace user defined concepts. Hence, when fuzzing is enabled, the server's in depth knowledge regarding semantics of the language code (e.g., manner of parsing) can be employed to determine vulnerabilities thereof. In addition, logic of testing can be employed in conjunction with the code that understands how to implement it.

For example, as part of defining SQL statements associated with the parser, values can be separated into the actual grammar and values that are explicitly defined by the user. When the parser receives the SQL statements, values that are explicitly defined by the user can be updated, wherein an output of the parser includes fuzz values that form a valid text in place of user defined concepts. Accordingly, fuzzing can be performed in a smart manner, since the fuzz values that replace explicit user defined concepts can be generated within the server. For example, the parser's knowledge about what to fuzz (and what not to fuzz) can be leveraged to perform smart fuzzing, and facilitate testers's operation. In addition, a legitimate data tree structure (e.g., correct syntax for SQL statements) can be obtained with fuzz values in place of what user has initially defined.

According to a further aspect of the subject innovation, the T-SQL language fuzz testing is built into capabilities of the SQL server itself. Various language entry points are identified wherein SQL statements such as, data modification language (DML), data definition language (DDL), stored procedure (SP)/functions, and the like can subsequently be processed. Moreover, code can be injected in such locations, so the language inputs and parameters can be fuzzed (e.g., randomly or deterministically) based on different fuzzing algorithms. Hence, the fuzz code within the product can change the input parameters and inputs on the fly, while iterating through typically all different combinations applicable to the statements coming in.

Furthermore, a signal can be generated to indicate that fuzzing is no longer required for the current statement, and another statement is then evaluated for fuzzing. The fuzzer capability can be switched on/off during run time (e.g., without restarting SQL server) to indicate whether received SQL statements should go through fuzzing code path, or achieve fuzzer testing automatically. Such built-in fuzzer can also retain information statements and combinations that it has exercised (e.g., to avoid a subsequent fuzzing when the same statement and combination are encountered next time.) Such enables fuzzer testing to operate deep into product code and carry out fuzzing at deeper level as compared to conventional fuzzer testing that are typically focused at network protocol layer/language entry points; and simply reject most malformed requests and inputs of normal fuzzer testing, which further leave the internal product code untested.

The subject innovation further enables fuzzing of a server (e.g., the target system), to determine which tokens in the statement are under the control of the attacker without generating a parsing error. The initial user inputs are replaced with fuzz values, while maintaining conformance to formats and preconditions of SQL statements (e.g., without generating parser error), to obtain fuzzer tests executed through inside layers of the product code path. Hence, syntactical errors can be mitigated, while using existing data flow and testing infrastructures.

In a related aspect, a fuzz tracking component can track the fuzzed values, and keep track of language statements and objects, which have been fuzzed (e.g., not repeat them in future.) Hence, by maintaining track of a previous state (e.g. what statements have been fuzzed and what was the outcome of the fuzzing strategy), non-repetitive fuzzing of interesting language statements and objects of the system can be obtained.

Additionally, the target system can specify a finite list of known malicious/interesting values, to provide an exhaustive, non repetitive iteration through combinations for any given statement using each member of such list. Moreover, a transformation tracking component can track transformations that have occurred, so that the system can apply exactly the same transformation on same tokens that are received again. Such allows any subsequent statements to run with the same transformation, and preserve any existing preconditions (e.g., if input token "data01" was transformed once to fuzzed token "fuzzed01", anytime the system encounters the same token again—the exact same transformation can be performed thereon.)

It is to be appreciated that the fuzzing system can employ pluggable fuzzing logic. Such plug-in component can be created by external entities (e.g., third parties), and incorporated into the fuzzing systems (e.g., via extensibility hooks) to enable various testing scenarios.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

The various aspects of the subject innovation are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

Figure 1:
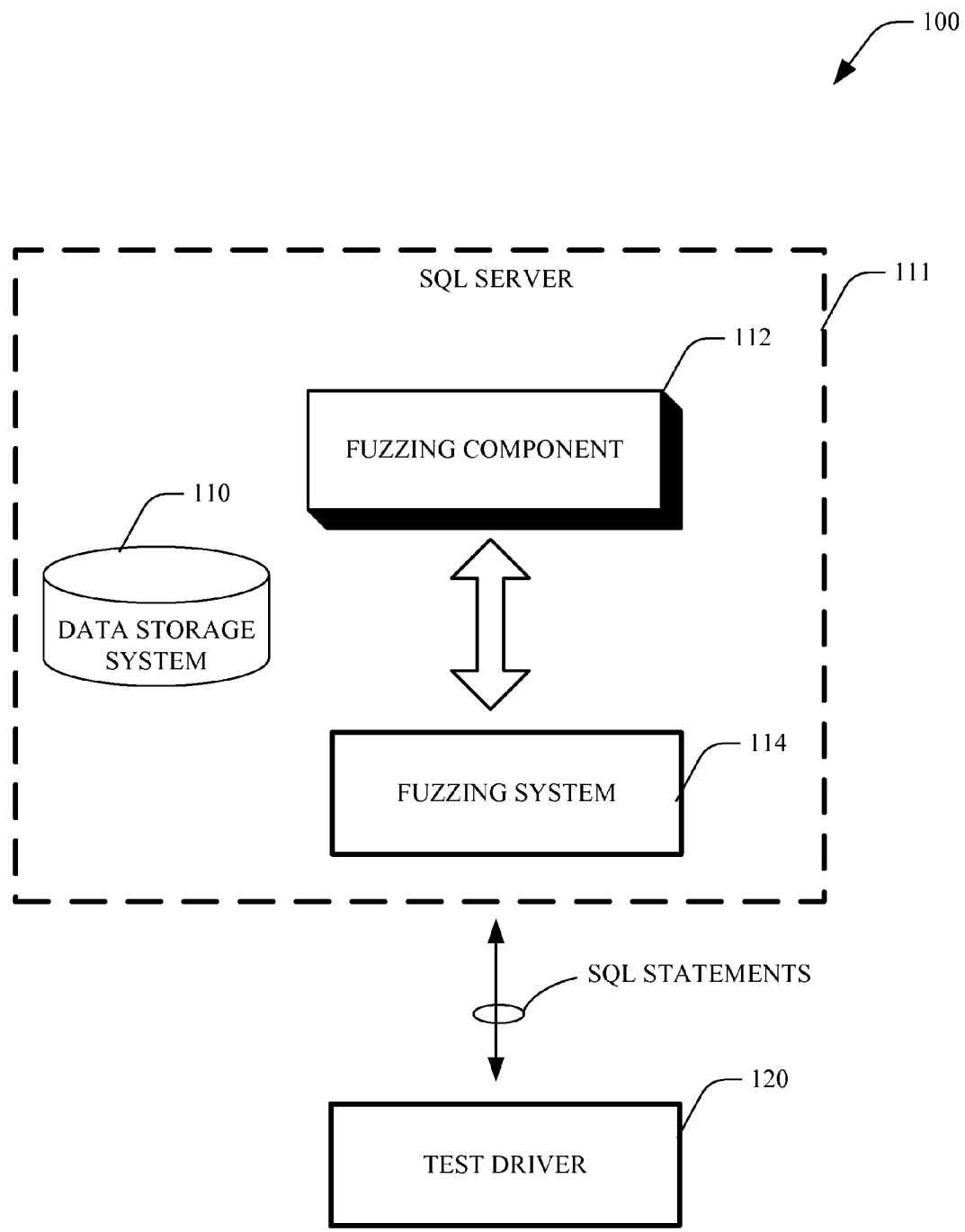
FIG. 1 illustrates a block diagram of a system that facilitates fuzz testing as part of a Structured Query Language (SQL) server in accordance with an aspect of the subject innovation.

FIG. 1 illustrates a block diagram of a system 100 that builds language fuzz testing as part of the SQL server 111 in accordance with an aspect of the subject innovation. The system 100 provides for a plurality of tests by the test driver 120 to run by the fuzzing component 112 when fuzzing is enabled. The fuzzing component 112 provides an entry point for accessing the fuzzing system 114 to update explicit user specified parameters associated with SQL statements (e.g., constant values, table names and the like)—hence mitigating a requirement of writing specific fuzzer tests.

The test driver 120 can supply structured and/or potentially invalid input and SQL statements for the SQL server 111 and associated software application programming interfaces (APIs) and network interfaces to maximize the likelihood of detecting errors that can lead to system vulnerabilities. The fuzzing component 112 can replace initial user inputs with fuzz values, while maintaining conformance to formats and preconditions of SQL statements (e.g., without generating parser error), to obtain fuzzer tests executed through inside layers of the product code path. Hence, syntactical errors can be mitigated, while using existing data flow and testing infrastructures.

The SQL server 111 can associate with a data storage system 110, wherein such data storage system 110 can be a complex model based at least upon a database structure, wherein an item, a sub-item, a property, and a relationship are defined to allow representation of information within a data storage system as instances of complex types. For example, the data storage system 110 can employ a set of basic building blocks for creating and managing rich, persisted objects and links between objects. An item can be defined as the smallest unit of consistency within the data storage system 110, which can be independently secured, serialized, synchronized, copied, backup/restored, and the like. Such item can include an instance of a type, wherein all items in the data storage system 110 can be stored in a single global extent of items. The data storage system 110 can be based upon at least one item and/or a container structure. Moreover, the data storage system 110 can be a storage platform exposing rich metadata that is buried in files as items. The data storage system 110 can include a database, to support the above discussed functionality, wherein any suitable characteristics and/or attributes can be implemented. Furthermore, the data storage system 110 can employ a container hierarchical structure, wherein a container is an item that can contain at least one other item. The containment concept is implemented via a container ID property inside the associated class. A store can also be a container such that the store can be a physical organizational and manageability unit. In addition, the store represents a root container for a tree of containers within the hierarchical structure.

Figure 2:
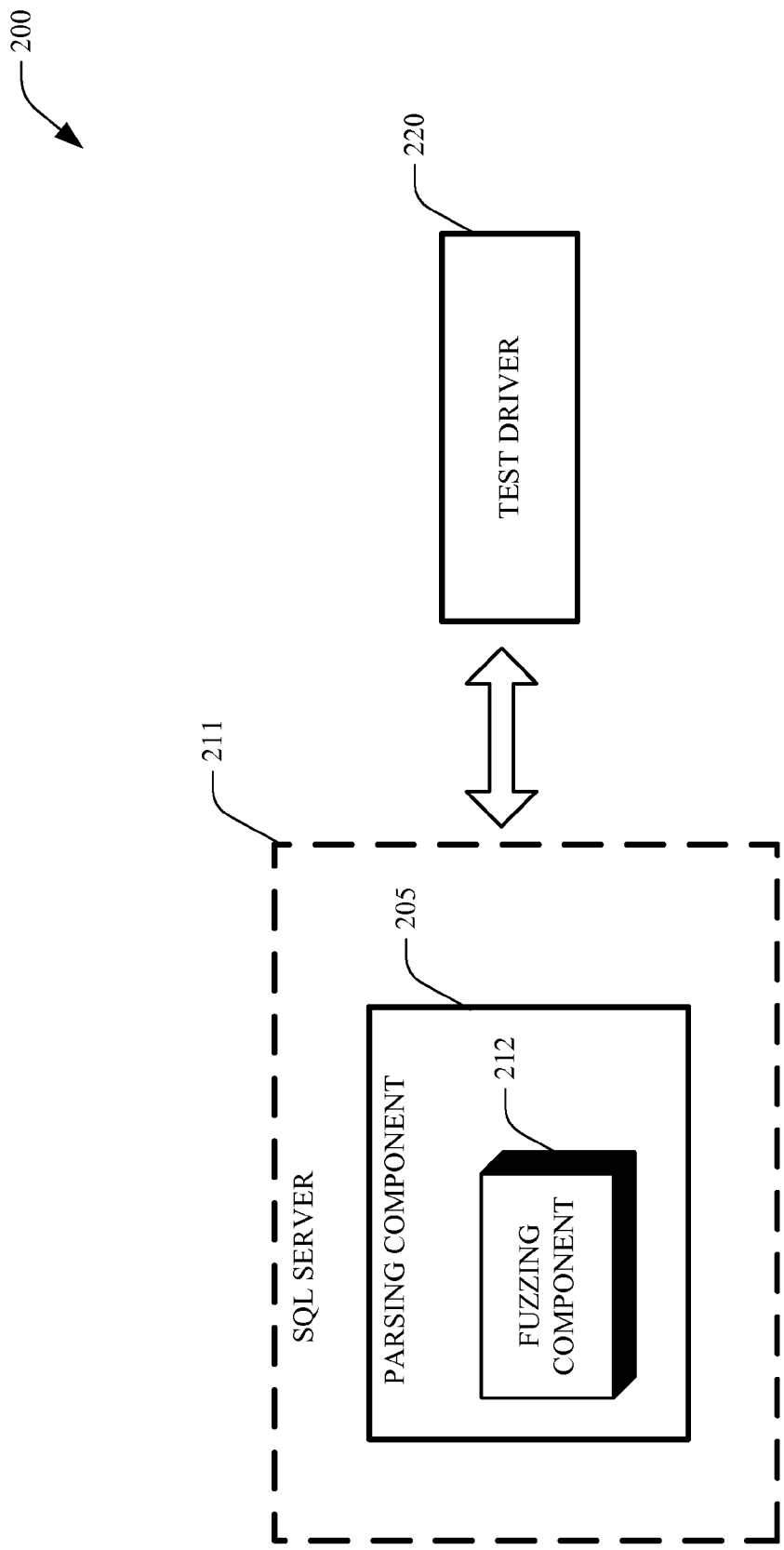
FIG. 2 illustrates a further block diagram of a fuzzing component as part of the SQL server according to another aspect of the subject innovation.

FIG. 2 illustrates a further block diagram of a fuzzing component 212 as part of the SQL server according to another aspect of the subject innovation. The fuzzing component 212 can be part of the parsing component 205, wherein from a point of view thereof, an output can includes fuzz values that are potentially generated inside the SQL server (e.g., risky constructs, random values, and the like), and which replace user defined concepts.

In general, the parsing component 205 is responsible for translating SQL statements received from the test driver 220 into an equivalent relational algebra tree. For example, the parsing component 205 can operate on a textual representation of received SQL statements from the test driver 220, and divide such statement into fundamental components (e.g., tokens), and verify that the statement conforms to the SQL language grammar rules. The output of the parsing component 205 can be in form of a relational operator (RelOp) tree. Hence, when fuzzing is enabled in the fuzzing component 212, the server's in depth knowledge regarding semantics of the language code (e.g., manner of parsing) can be employed to determine vulnerabilities thereof, wherein logic of testing can be used in conjunction with the code that understands how to implement it.

For example, as part of defining SQL statements associated with the parsing component 205, values can be separated into the actual grammar and values that are explicitly defined by the user. When the parsing component 205 receives the SQL statement from the test driver 220, the values that are explicitly defined by the user can be updated, wherein an output of the parsing component 205 includes fuzz values that form a valid text in place of user defined concepts. Accordingly, since the fuzz values (that replace explicit user defined concepts) can be generated within the SQL server 211, fuzzing can be performed in a smart manner. For example, knowledge of the parsing component 205 about what to fuzz (and what not to fuzz) can be leveraged to perform smart fuzzing, and facilitate testers's operation. Moreover, a legitimate data tree structure (e.g., correct syntax for SQL statements) can be obtained with fuzz values in place of what user has initially defined.

Figure 3:
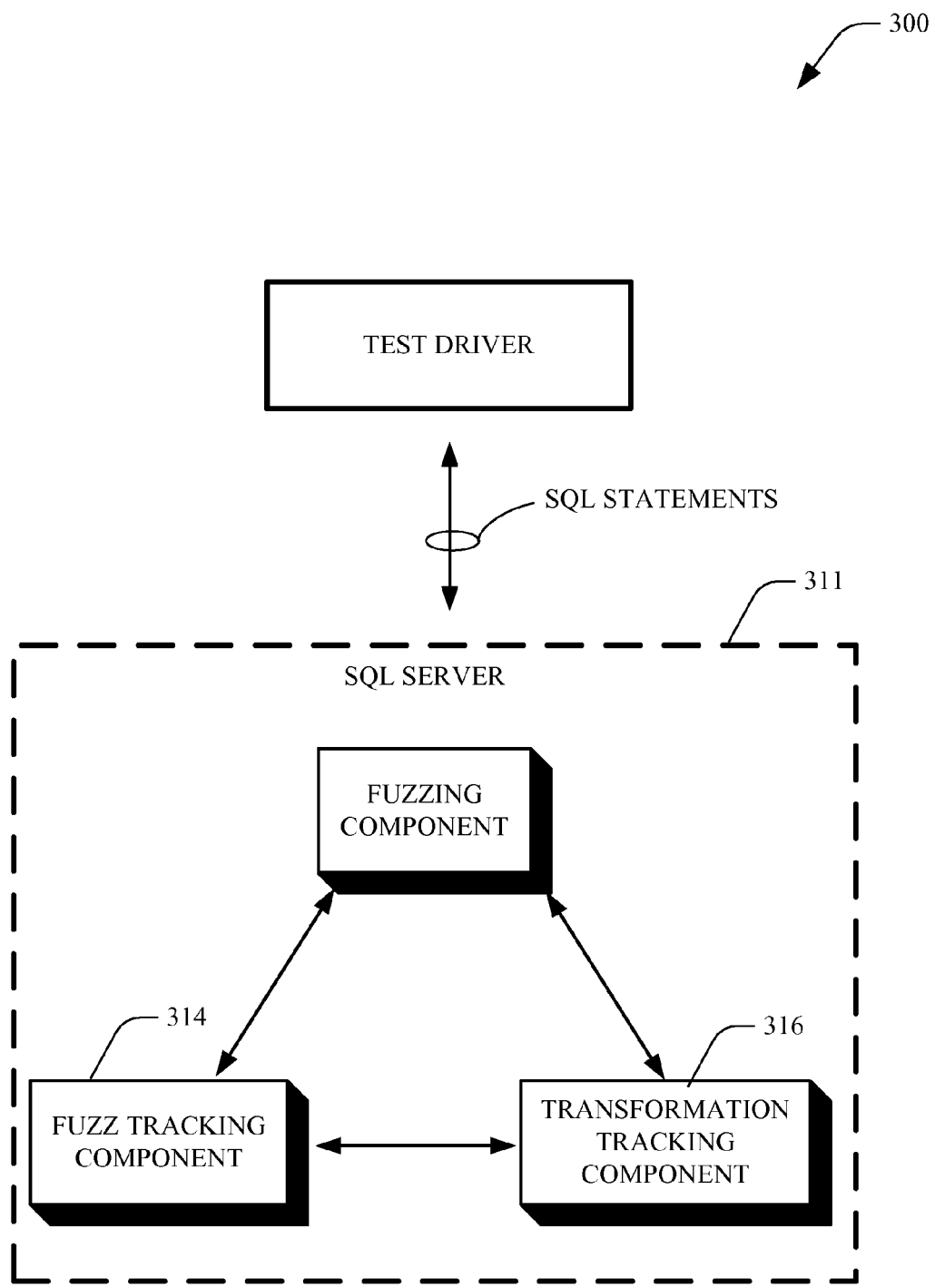
FIG. 3 illustrates an exemplary system of security fuzzing in accordance with an aspect of the subject innovation.

FIG. 3 illustrates an exemplary system of security fuzzing in accordance with an aspect of the subject innovation, which employs tracking features for both fuzz tracking and transformation tracking. The fuzz tracking component 314 can track the fuzzed values, and keep track of language statements and objects, which have been fuzzed (e.g., not repeat them in future.) Hence, by maintaining track of a previous state (e.g. what statements have been fuzzed and what was the outcome of the fuzzing strategy), non-repetitive fuzzing of interesting language statements and objects of the product can be obtained.

Typically, the SQL server 311 can specify a finite list of known malicious/interesting values, to provide an exhaustive, non repetitive iteration through combinations for any given statement using each member of such list. Moreover, a transformation tracking component 316 can track transformations that have occurred, so that the system 300 can apply exactly the same transformation on same tokens that are received again. Such allows any subsequent statements to run with the same transformation, and preserve any existing preconditions (e.g., if input token "data01" was transformed once to fuzzed token "fuzzed01", anytime the system 300 encounters the same token again—the exact same transformation can be performed thereon.)

Figure 4:
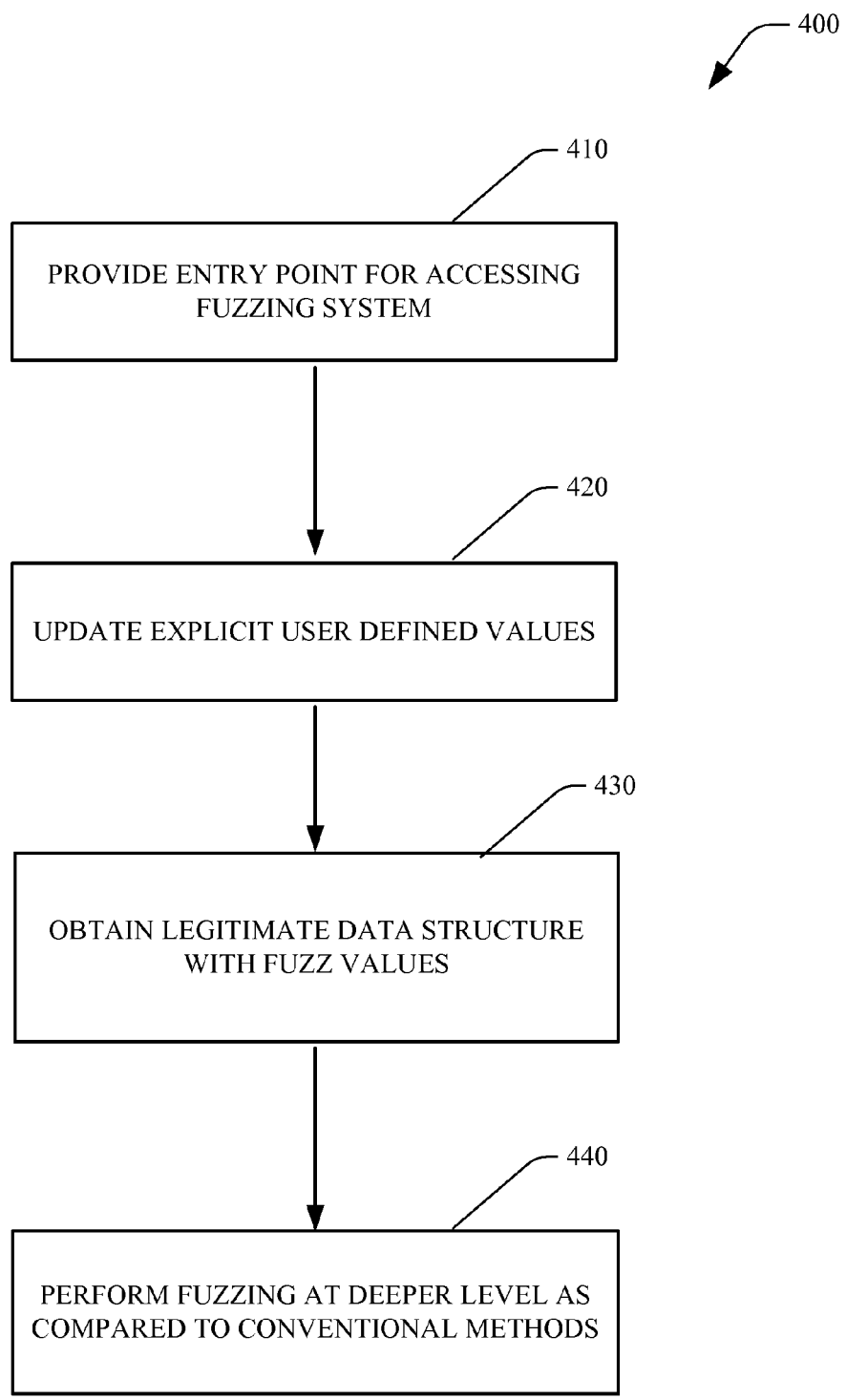
FIG. 4 illustrates a related methodology of security fuzzing in accordance with a further aspect of the subject innovation.

FIG. 4 illustrates a related methodology 400 of security fuzzing in accordance with an aspect of the subject innovation. While the exemplary method is illustrated and described herein as a series of blocks representative of various events and/or acts, the subject innovation is not limited by the illustrated ordering of such blocks. For instance, some acts or events may occur in different orders and/or concurrently with other acts or events, apart from the ordering illustrated herein, in accordance with the innovation. In addition, not all illustrated blocks, events or acts, may be required to implement a methodology in accordance with the subject innovation. Moreover, it will be appreciated that the exemplary method and other methods according to the innovation may be implemented in association with the method illustrated and described herein, as well as in association with other systems and apparatus not illustrated or described. Initially and at 410 entry points for accessing the fuzzing system can be provided as part of the SQL server. Next and at 420, values associated with SQL statements that are explicitly defined by a user can be updated, wherein an output of a parser of the target system includes fuzz values that form a valid text in place of user defined concepts. For example, the parser's knowledge about what to fuzz (and what not to fuzz) can be leveraged to perform smart fuzzing, and facilitate testers's operation. Subsequently, at 430 a legitimate data tree structure (e.g., correct syntax for SQL statements) can be obtained with fuzz values in place of what user has initially defined. Next, and at 440 fuzzing can be performed at a deeper level as compared to conventional fuzzer testing that are typically focused at network protocol layer/language entry points; and simply reject most malformed requests and inputs of normal fuzzer testing, which further leave the internal product code untested.

Figure 5:
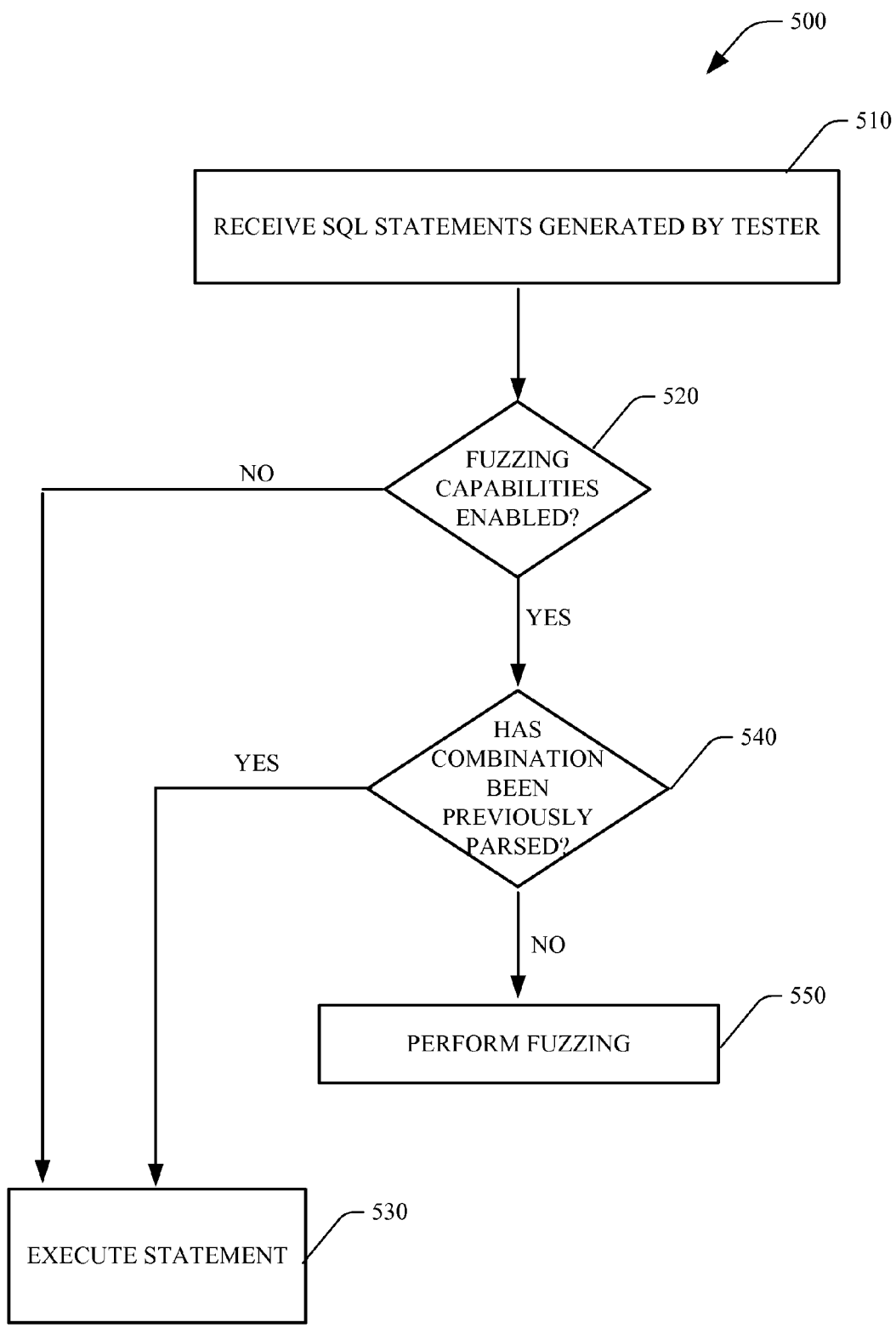
FIG. 5 illustrates an exemplary methodology to facilitate penetration testing in accordance with a particular aspect of the subject innovation.

FIG. 5 illustrates a related methodology 500 that facilitates penetration testing in accordance with a particular aspect of the subject innovation. Initially and at 510, SQL statements generated by a test driver can be received by an SQL server for a parsing thereof. Subsequently and at 520, a determination is performed as to whether the fuzzing capability associated with the SQL server is on. If not, the received SQL statement is processed regularly and the statement executed at 530. Otherwise, and if the fuzzer capabilities are turned on, then at 540 a determination is made as to whether combination associated with the parsed SQL statement has been parsed before. If so, execution of the statement can occur as previously performed and executed at 530. Otherwise, and a new statement is encountered or a new fuzzing combination, the fuzzer code can change the input or the parameters according to predefined rules, and the methodology proceeds to act 550, wherein fuzzing is performed with values that are potentially generated inside the SQL server. Hence, by maintaining track of a previous state (e.g. what statements have been fuzzed and what was the outcome of the fuzzing strategy), non-repetitive fuzzing of interesting language statements and objects of the system can be obtained.

Moreover, previously encountered statements and fuzzing combination can be stored in a data store for easy look up purposes as well as for parallelism. Such statements are then passed to execution engine of the server for normal execution, and the results are logged and checked by Test Driver. If there exists additional variations that can be fuzzed, the fuzzing methodology can loop through various combinations. It is to be appreciated that the fuzzing system can employ pluggable fuzzing logic. Such plug-in component can be created by external entities (e.g., third parties), and incorporated into the fuzzing systems (e.g., via extensibility hooks) to enable various testing scenarios.

Figure 6:
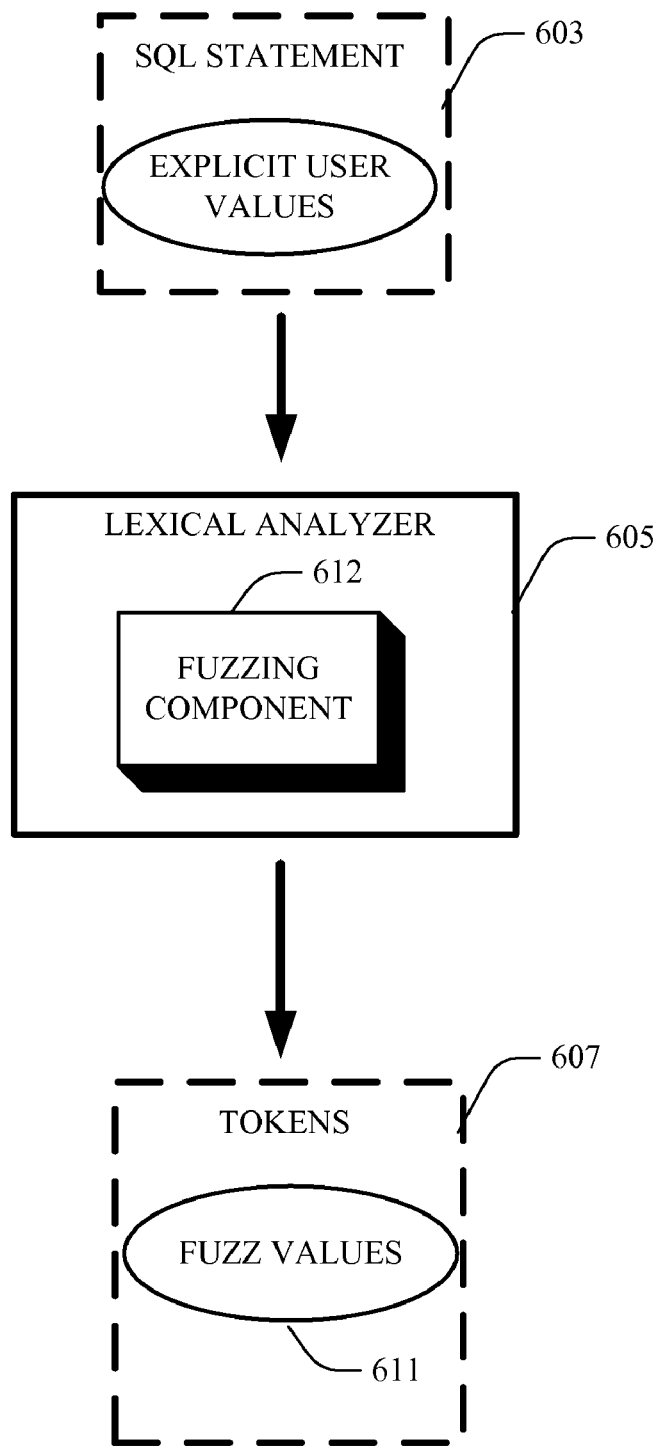
FIG. 6 illustrates a lexical analyzer with fuzzing component according to an aspect of the subject innovation.

FIG. 6 illustrates a further aspect of the subject innovation, wherein input parameters are changed thru a lexical analyzer 605 that includes a fuzzer component 612, to facilitate penetration testing. In general, the lexical analyzer 605 processes an input sequence of characters related to the SQL statement 603 to produce, as output, a sequence of tokens 607, which includes fuzz values 611. Various language entry points are identified, wherein the SQL statements 603 such as, data modification language (DML), data definition language (DDL), stored procedure (SP)/functions, and the like can subsequently be processed. Moreover, code can be injected in such locations, so the language inputs and parameters can be fuzzed (e.g., either randomly or deterministically) based on different fuzzing algorithms. The fuzz code within the product can change the input parameters and inputs on the fly, while iterating through typically all different combinations applicable to the statements coming in. In addition, by keeping track of a lookup table during fuzzing and upon receipt of a constant parameter that can be replaced, the server can perform such replacement with: 1) the same value as before for the particular constant/parameter value, or 2) with a random value. It is to be appreciated that the server can also maintain the value as is, and without a replacement thereof.

Figure 7:
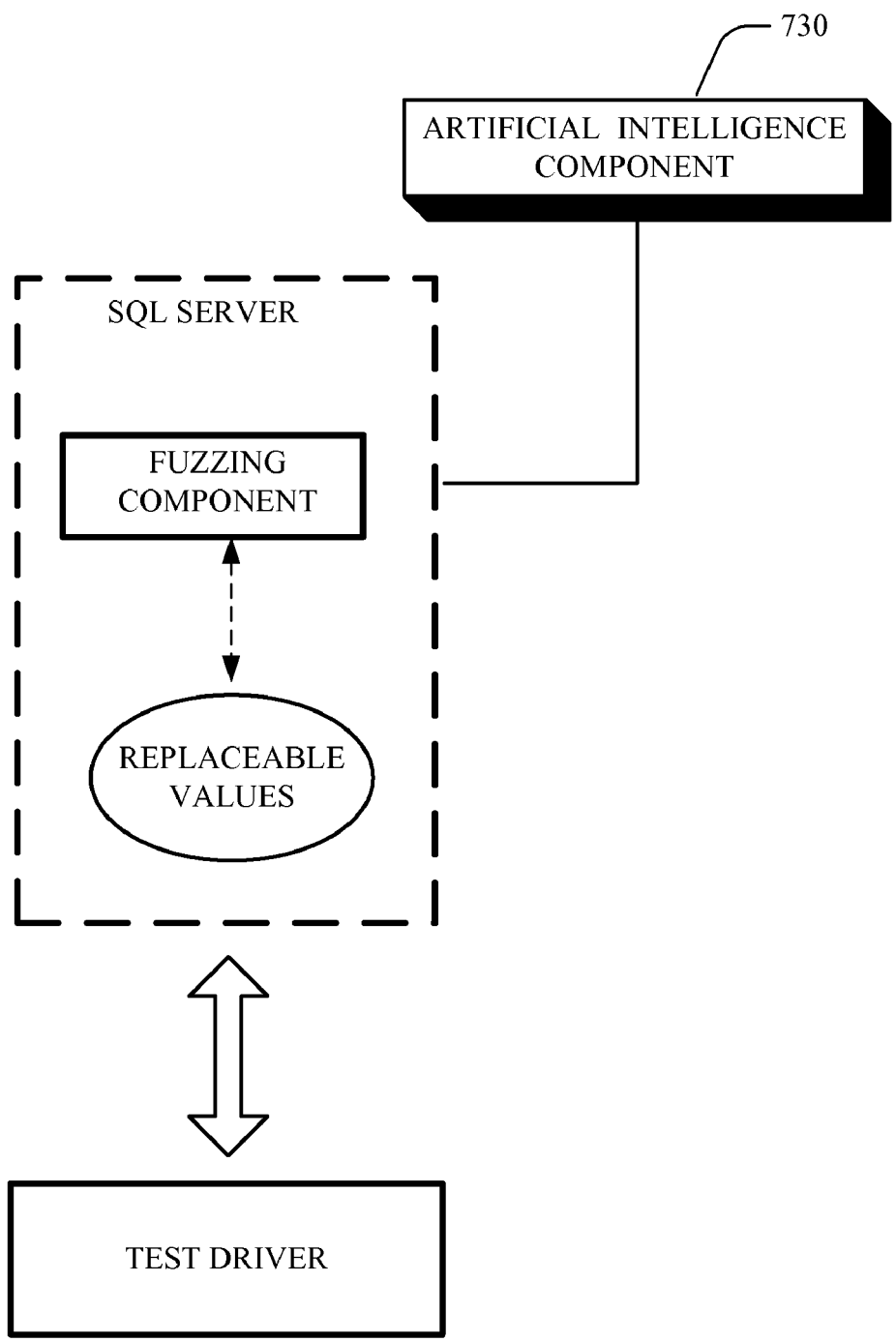
FIG. 7 illustrates an artificial intelligence (AI) component that can be employed to replacing user defined values with fuzz values in accordance with an aspect of the subject innovation.

FIG. 7 illustrates an artificial intelligence (AI) component 730 that can be employed to facilitate inferring and/or determining when, where, how to replace user defined values with fuzz values in accordance with an aspect of the subject innovation. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

The AI component 730 can employ any of a variety of suitable AI-based schemes as described supra in connection with facilitating various aspects of the herein described invention. For example, a process for learning explicitly or implicitly how a value related to a parsed SQL statement should be replaced can be facilitated via an automatic classification system and process. Classification can employ a probabilistic and/or statistical-based analysis (e.g., factoring into the analysis utilities and costs) to prognose or infer an action that a user desires to be automatically performed. For example, a support vector machine (SVM) classifier can be employed. Other classification approaches include Bayesian networks, decision trees, and probabilistic classification models providing different patterns of independence can be employed. Classification as used herein also is inclusive of statistical regression that is utilized to develop models of priority.

As will be readily appreciated from the subject specification, the subject innovation can employ classifiers that are explicitly trained (e.g., via a generic training data) as well as implicitly trained (e.g., via observing user behavior, receiving extrinsic information) so that the classifier is used to automatically determine according to a predetermined criteria which answer to return to a question. For example, with respect to SVM's that are well understood, SVM's are configured via a learning or training phase within a classifier constructor and feature selection module. A classifier is a function that maps an input attribute vector, x=(x1, x2, x3, x4, xn), to a confidence that the input belongs to a class—that is, f(x)=confidence(class).

Figure 8:
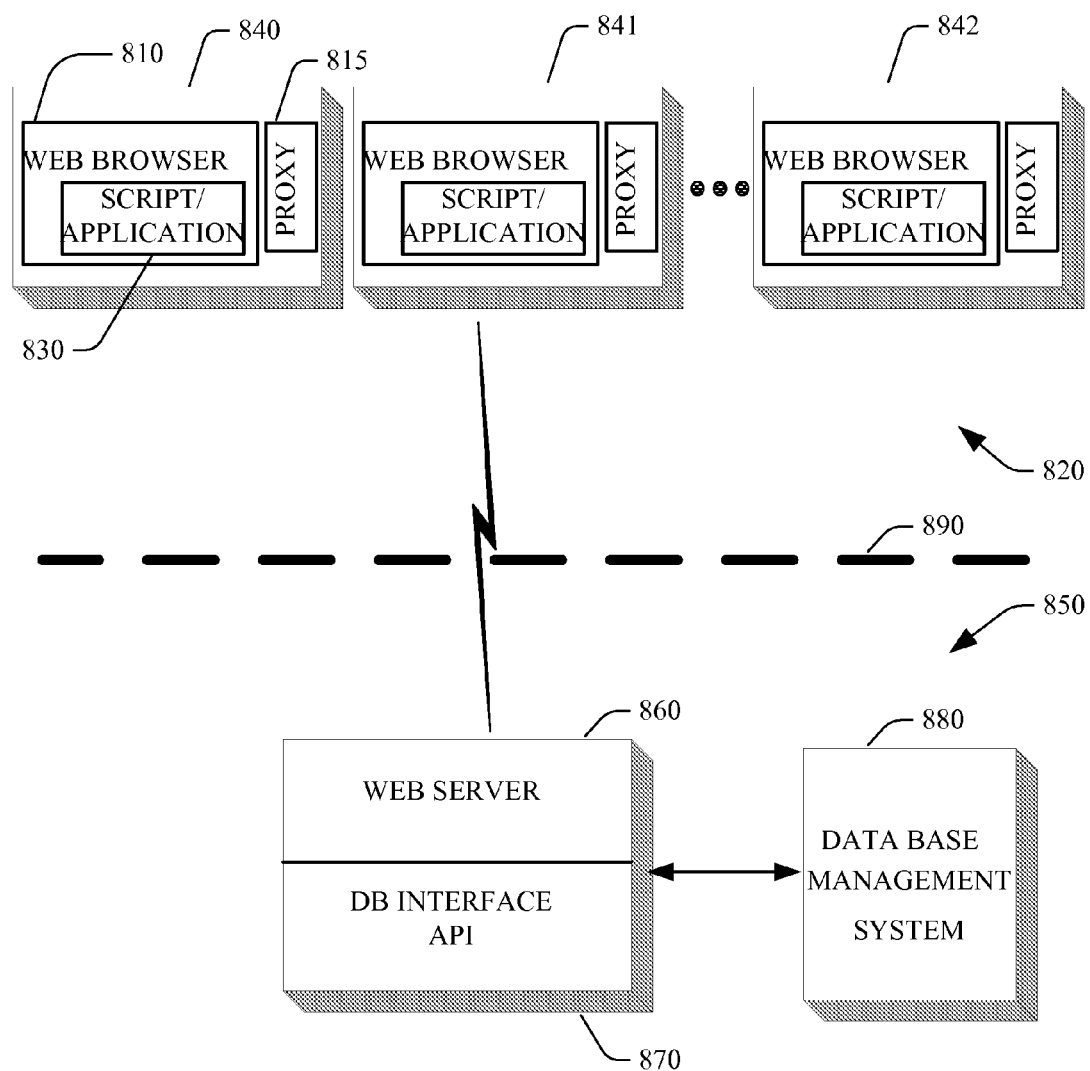
FIG. 8 illustrates a plurality of test drivers in form of clients that perform fuzz testing on the server side.

FIG. 8 illustrates a plurality of test drivers in form of clients 840, 841, 842 that perform fuzz testing on the server side 850 in accordance with an aspect of the subject innovation, wherein running on each of the clients 840, 841, 842 can be a client process, for example, a web browser 810. Likewise, running on the server 850 can be a corresponding server process, for example, a web server 860. In addition, embedded in the Web Browser 810 can be a script or application 830, and running within the run-time environment 840 of the client side 820, can exist a proxy 815 for packaging and unpacking data packets formatted. Communicating with the server 850, which incorporates fuzzing capabilities as part thereof, is a database management system (DBMS) 880, which manages access to a database (not shown). The DBMS 880 and the database (not shown) can be located in the server itself, or can be located remotely on a remote database server (not shown). Running on the Web server 860 is a database interface Applications Programming Interface (API) 870, which provides access to the DBMS 880. The client computer 820 and the server computer 850 can communicate with each other through a network 890. It is to be appreciated that other arrangements are also possible, for example the client computer and the server computer being the same computer. When the client process, e.g., the Web browser 810, requests data from a database, the script or application 830 issues a query, which is sent across the network (e.g. internet) 890 to the server computer 850, where it is interpreted by the server process, e.g., the Web server 860. The client's 820 request to server 850 can contain multiple commands, and a response from server 850 can return a plurality of result sets.

In such communication, session, presentation, and application service elements can be provided by Tabular Data Stream (TDS). Since TDS does not require any specific transport provider, it can be implemented over multiple transport protocols and the network 890. Responses to client commands that are returned can be self-describing, and record oriented; (e.g., the data streams can describe names, types and optional descriptions of rows being returned.)

On the client side 820 the data can be a Structured Query Language (SQL) command being in a language that the server side 850 can accept, a SQL command followed by its associated binary data (e.g., the data for a bulk copy command), or an attention signal. When a connection is desired, the client 820 can send a connection signal to the server. Even though the client 820 can have more than one connection to the server 850, each connection path can be established separately and in the same manner.

Once the server 850 has received the connection signal from the client 820 it will notify the client that it has either accepted or rejected the connection request. Likewise to send SQL command or batch of SQL commands, then the SQL command (e.g., represented by a Unicode format) can be copied into the data section of a buffer and then sent to the SQL Server side 850. By enabling fuzzing on the SQL server side 850, the server's in depth knowledge regarding semantics of the language code (e.g., manner of parsing) can be employed to determine vulnerabilities thereof, wherein logic of testing can be used in conjunction with the code that understands how to implement it.

The word "exemplary" is used herein to mean serving as an example, instance or illustration. Any aspect or design described herein as "exemplary" is not necessarily to be construed as preferred or advantageous over other aspects or designs. Similarly, examples are provided herein solely for purposes of clarity and understanding and are not meant to limit the subject innovation or portion thereof in any manner. It is to be appreciated that a myriad of additional or alternate examples could have been presented, but have been omitted for purposes of brevity.

Furthermore, all or portions of the subject innovation can be implemented as a system, method, apparatus, or article of manufacture using standard programming and/or engineering techniques to produce software, firmware, hardware or any combination thereof to control a computer to implement the disclosed innovation. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 9:
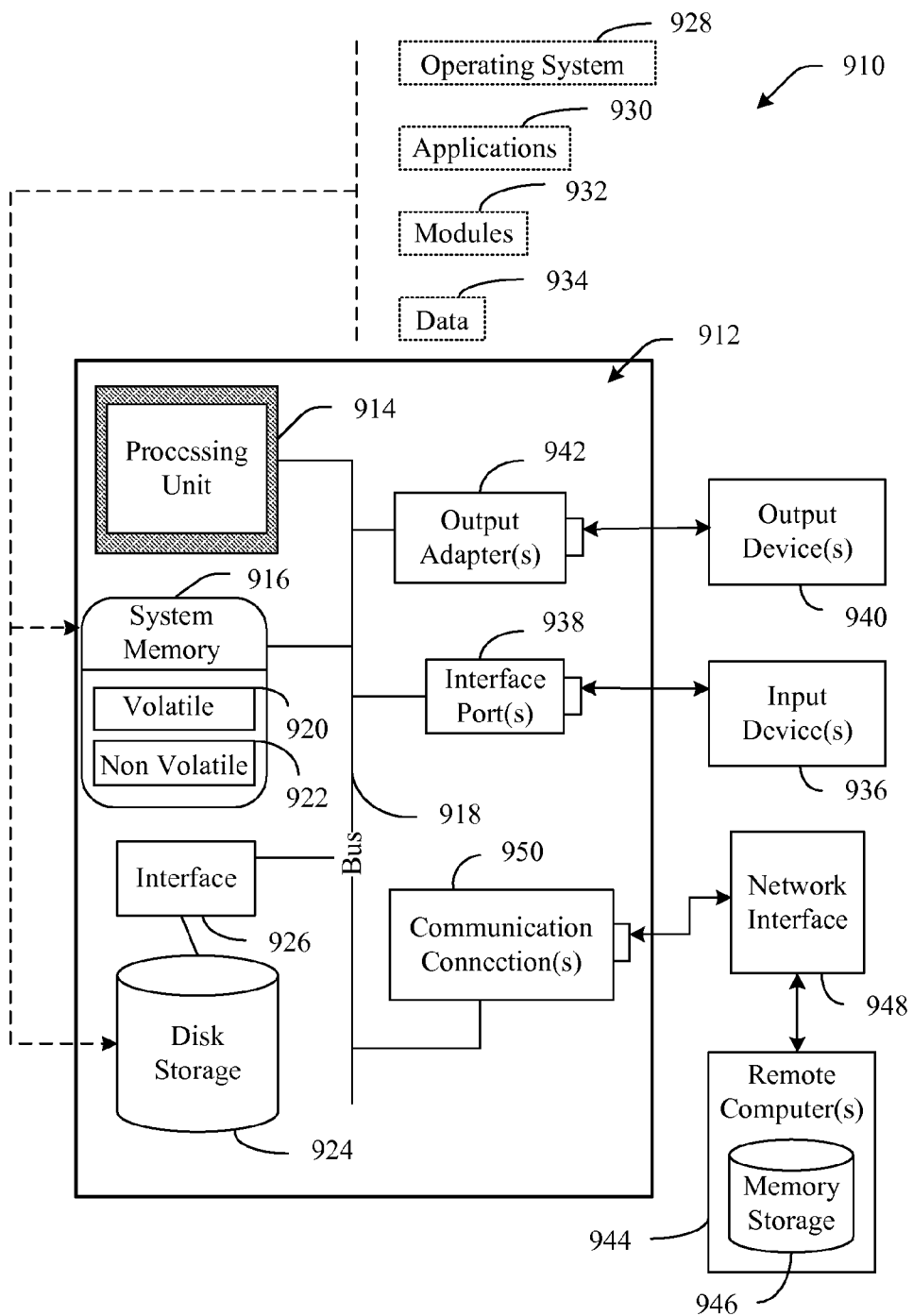
FIG. 9 illustrates an exemplary environment for implementing various aspects of the subject innovation.
Figure 10:
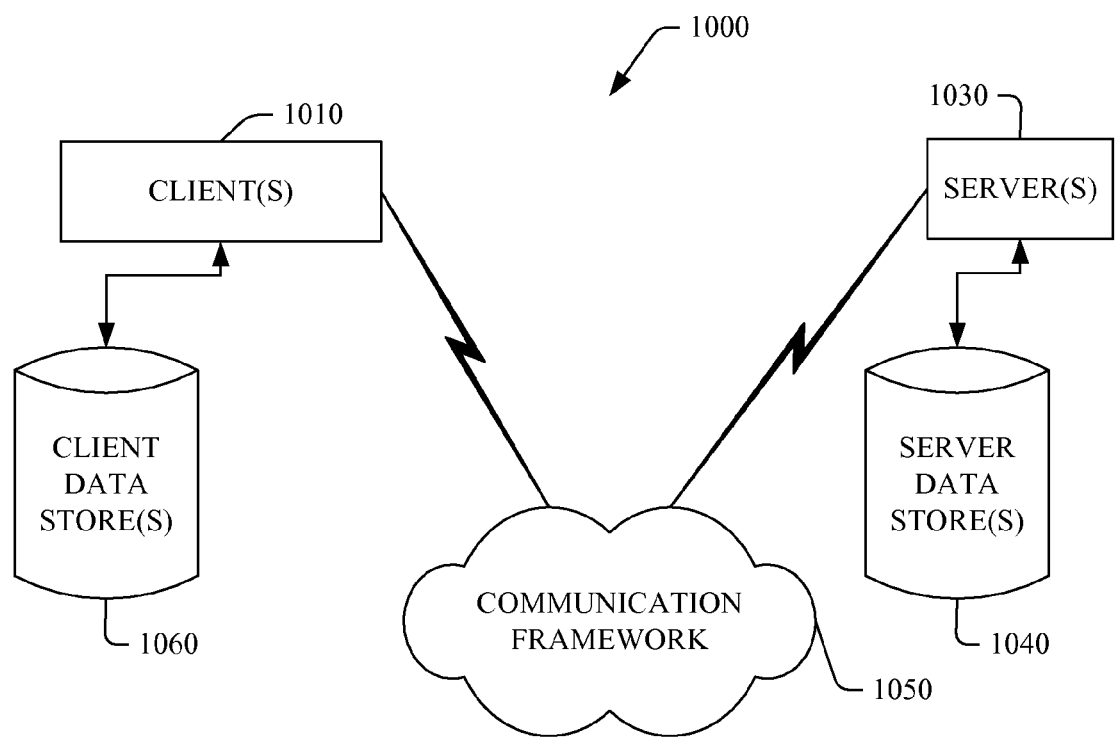
FIG. 10 is a schematic block diagram of a sample-computing environment that can be employed for fuzz testing according to an aspect of the subject innovation.

In order to provide a context for the various aspects of the disclosed subject matter, FIGS. 9 and 10 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the innovation also may be implemented in combination with other program modules. Generally, program modules include routines, programs, components, data structures, and the like, which perform particular tasks and/or implement particular abstract data types. Moreover, those skilled in the art will appreciate that the innovative methods can be practiced with other computer system configurations, including single-processor or multiprocessor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the innovation can be practiced on stand-alone computers. In a distributed computing environment, program modules may be located in both local and remote memory storage devices.

With reference to FIG. 9, an exemplary environment 910 for implementing various aspects of the subject innovation is described that includes a computer 912. The computer 912 includes a processing unit 914, a system memory 916, and a system bus 918. The system bus 918 couples system components including, but not limited to, the system memory 916 to the processing unit 914. The processing unit 914 can be any of various available processors. Dual microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable ROM (EEPROM), or flash memory. Volatile memory 920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 912 also includes removable/non-removable, volatile/non-volatile computer storage media. FIG. 9 illustrates a disk storage 924, wherein such disk storage 924 includes, but is not limited to, devices like a magnetic disk drive, floppy disk drive, tape drive, Jaz drive, Zip drive, LS-60 drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used such as interface 926.

It is to be appreciated that FIG. 9 describes software that acts as an intermediary between users and the basic computer resources described in suitable operating environment 910. Such software includes an operating system 928. Operating system 928, which can be stored on disk storage 924, acts to control and allocate resources of the computer system 912. System applications 930 take advantage of the management of resources by operating system 928 through program modules 932 and program data 934 stored either in system memory 916 or on disk storage 924. It is to be appreciated that various components described herein can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computer 912, and to output information from computer 912 to an output device 940. Output adapter 942 is provided to illustrate that there are some output devices 940 like monitors, speakers, and printers, among other output devices 940 that require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

FIG. 10 is a schematic block diagram of a sample-computing environment 1000 that can be employed for fuzz testing. The system 1000 includes one or more client(s) 1010. The client(s) 1010 can be hardware and/or software (e.g., threads, processes, computing devices). The system 1000 also includes one or more server(s) 1030. The server(s) 1030 can also be hardware and/or software (e.g., threads, processes, computing devices). The servers 1030 can house threads to perform transformations by employing the components described herein, for example. One possible communication between a client 1010 and a server 1030 may be in the form of a data packet adapted to be transmitted between two or more computer processes. The system 1000 includes a communication framework 1050 that can be employed to facilitate communications between the client(s) 1010 and the server(s) 1030. The client(s) 1010 are operatively connected to one or more client data store(s) 1060 that can be employed to store information local to the client(s) 1010. Similarly, the server(s) 1030 are operatively connected to one or more server data store(s) 1040 that can be employed to store information local to the servers 1030.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims.

Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer implemented system comprising the following computer executable components:
    a processor; and
    a memory component communicatively coupled to the processor, the memory component having stored therein computer-executable instructions that when executed by the processor cause the processor to implement:
        a fuzzing system that receives a structured query language (SQL) statement, wherein the SQL statement includes actual grammar associated with the SQL statement and explicit user specified parameters associated with penetration testing of an SQL server; and
        a parsing component as part of the SQL server that separates the explicit user specified parameters from the actual grammar associated with the SQL statement, wherein the parsing component mitigates parsing errors by replacing the explicit user specified parameters with fuzz values generated within the SQL server that maintain conformance to syntactically correct SQL statements.

2. The computer implemented system of claim 1, wherein the parsing component translates the explicit user specified parameters into transact SQL language.

3. The computer implemented system of claim 1 further comprising a transact SQL language fuzz testing component built into the SQL server.

4. The computer implemented system of claim 1 further comprising a switch that controls fuzzing capability during runtime.

5. The computer implemented system of claim 1 further comprising a fuzz tracking component that tracks fuzzed values.

6. The computer implemented system of claim 1 further comprising a transformation component that tracks occurred transformations.

7. The computer implemented system of claim 1, the fuzzing component employs pluggable fuzzing logic.

8. The computer implemented system of claim 1 the fuzzing component with knowledge regarding semantics for language code of the SQL server.

9. A computer implemented method comprising the following computer executable acts:
    employing a processor to execute computer executable instructions stored on a computer readable storage medium to implement the following acts:
        receiving a structured query language (SQL) statement, wherein the SQL statement includes actual grammar associated with the SQL statement and explicit user specified parameters;
        separating the explicit user specified parameters from the actual grammar associated with the SQL statement; and
        mitigating parsing errors by replacing the explicit user specified parameters with fuzz values created within an SQL server, wherein the fuzz values created within the SQL server maintain conformance to syntactically correct SQL statements.

10. The computer implemented method of claim 9 further comprising performing fuzzing at deeper levels than the network protocol layer.

11. The computer implemented method of claim 9 further comprising maintaining track related to a state of fuzzing the SQL server.

12. The computer implemented method of claim 9 further comprising storing fuzzing combinations in a data store.

13. The computer implemented method of claim 9 further comprising determining whether combinations associated with a query have been parsed prior to receiving the query.

14. The computer implemented method of claim 13 further comprising executing the query.

15. The computer implemented method of claim 14 further comprising logging results of executing the query.

16. The computer implemented method of claim 14 further comprising checking results for executing the query.

17. The computer implemented method of claim 14 further comprising looping through combinations of fuzzing variations.

18. The computer implemented method of claim 14 further comprising employing pluggable fuzzing logic for the fuzzing system.

19. A computer-readable storage medium comprising:
computer-readable instructions, the computer-readable instructions including instructions for causing at least one processor to perform the following acts:
receiving a structured query language (SQL) statement, wherein the SQL statement includes actual grammar associated with the SQL statement and explicit user specified parameters;
separating the explicit user specified parameters from the actual grammar associated with the SQL statement; and
mitigating parsing errors by replacing the explicit user specified parameters with fuzz values created within an SQL server, wherein the fuzz values created within the SQL server maintain conformance to syntactically correct SQL statement.

* * * * *

UNITED STATES PATENT AND TRADEMARK OFFICE
CERTIFICATE OF CORRECTION

PATENT NO. : 7,953,674 B2  Page 1 of 1
APPLICATION NO. : 11/750132
DATED : May 31, 2011
INVENTOR(S) : Jiazhen Wu et al.

It is certified that error appears in the above-identified patent and that said Letters Patent is hereby corrected as shown below:

In column 14, line 19, in Claim 19, delete "statement" and insert -- statements --, therefor.

Signed and Sealed this
Ninth Day of August, 2011

David J. Kappos
*Director of the United States Patent and Trademark Office*